United States Patent
Nishikitani et al.

[11] Patent Number: 5,940,202
[45] Date of Patent: *Aug. 17, 1999

[54] COUNTERELECTRODE FOR SMART WINDOW AND SMART WINDOW

[75] Inventors: Yoshinori Nishikitani; Takaya Kubo; Nobuyuki Kuroda, all of Kanagawa-ken, Japan

[73] Assignee: Nippon Oil Co., Ltd, Tokyo, Japan

[*] Notice: This patent is subject to a terminal disclaimer.

[21] Appl. No.: 08/911,229

[22] Filed: Aug. 15, 1997

Related U.S. Application Data

[63] Continuation of application No. 08/536,957, Sep. 29, 1995, Pat. No. 5,724,176, which is a continuation-in-part of application No. 08/215,194, Mar. 21, 1994, abandoned.

[30] Foreign Application Priority Data

Mar. 30, 1993 [JP] Japan ........................... 5-72179

[51] Int. Cl.$^6$ ..................................... G02F 1/153
[52] U.S. Cl. .......................... 359/269; 359/271
[58] Field of Search ........................ 359/269, 271

[56] References Cited

U.S. PATENT DOCUMENTS 5,724,176  3/1998  Nishikitani et al. .............. 359/271

*Primary Examiner*—Georgia Epps
*Assistant Examiner*—Dawn-Marie Bey
*Attorney, Agent, or Firm*—Darby & Darby

[57] ABSTRACT

A counterelectrode for a smart window contains a transparent substrate and a linear electrically conductive material formed on a surface of the transparent substrate. The electrically conductive material has a surface area of not less than 10 m$^2$/g and electrical conductivity of not less than $10^{-6} \Omega^{-1} \cdot cm^{-1}$ at 25° C. A smart window contains an electrochromic electrode having a layer of an electrochromic material formed on its surface, and a layer of an electrolyte arranged between the counterelectrode and the electrochromic electrode and in contact with the layer of the electrochromic material.

19 Claims, 2 Drawing Sheets

COUNTERELECTRODE FOR SMART WINDOW AND SMART WINDOW

CROSS-REFERENCE TO RELATED APPLICATION

This is a continuation of application Ser. No. 08/536,957, filed Sep. 29, 1995, now U.S. Pat. No. 5,724,176 which is a continuation-in-part of application Ser. No. 08/215,194, filed Mar. 21, 1994, now abandoned.

BACKGROUND OF THE INVENTION

This invention relates to a counterelectrode for a smart window based upon electrochromism, and the electrochromic device or smart window having the counterelectrode as one of its constituent elements.

In recent years, the development in an electrochromic element based upon electrochromism, referred to herein as a smart window, is proceeding briskly. The smart window usually comprised of an electrochromic material and an electrolyte sandwiched between a transparent electrode and a counterelectrode, is a device which changes color with good color contrast on current conduction and current interruption. That is, when the current is supplied to the smart window, its electrochromic material is colored and, once it is colored, it is not bleached, that is it does not lose color, and can only be bleached when the current is caused to flow in the reverse direction. The smart window is expected to be used in future in a variety of applications, because it is not in need of the electric power except during coloring and during bleaching, and can be controlled more easily than a liquid crystal display device.

An electrochromic material for the smart window which is colored by reduction, such as $WO_3$, $MoO_3$, $V_2O_5$, $Nb_2O_5$ or $TiO_2$, and an electrochromic material which is colored by oxidation, such as $Cr_2O_3$, $MnO_2$, $CoO$ or $NiO$, have been employed. If such electrochromic material is used as one of the electrodes, it is required that the other electrode mounted facing the above-mentioned electrode with the electrolyte in-between, be transparent or light-transmitting or be colored in a complementary manner when driving the device in operation.

If an ITO glass commonly used as a transparent electrode of a common smart window is used as a counterelectrode of the smart window, the electrochromic efficiency becomes insufficient because of a smaller electrochemical capacity per unit area. If the electrical voltage applied across the electrodes is raised for improving the electrochromic efficiency, the cycle life of the coloration and bleaching cycles of the smart window is diminished.

Also, with a view to producing a smart window having a high electrochromic efficiency, it has been proposed in, for example, Japanese Laid-Open Patent Publications Nos. 62-151826 (1987), 62-204235 (1987) and 1-226122 (1989) to make combined use of an electrochromic material colored by reduction and an electrochromic material colored by oxidation within the inside of one and the same smart window.

However, none of the above-described prior-art materials or methods is as yet fully satisfactory as to the cycle life of the coloration and bleaching cycles under conditions of the higher electrochromic efficiency.

SUMMARY OF THE INVENTION

It is therefore an object of the present invention to provide a counterelectrode for a smart window which is substantially transparent and which has a sufficiently high electrochemical capacity per unit area.

It is another object of the present invention to provide a smart window with which it is possible to achieve a high electrochromic efficiency without limitation as to the type of the electrochromic material and which is superior in the cycle life of the coloration and bleaching cycles.

According to the present invention, there is provided a counterelectrode for a smart window comprising a transparent substrate and a linear electrically conductive material formed on a surface of the transparent substrate, the electrically conductive material having a surface area of not less than 10 $m^2/g$.

According to the present invention, there is also provided an electrochromic device or smart window having a transparent substrate and a linear electrically conductive material formed on a surface of the transparent substrate having a surface area of not less than 10 $m^2/g$, an electrochromic electrode having a layer of an electrochromic material formed on its surface, and a layer of an electrolyte arranged between the counterelectrode and the electrochromic electrode and in contact with the layer of the electrochromic material.

PREFERRED EMBODIMENTS OF THE INVENTION

Figure 1:
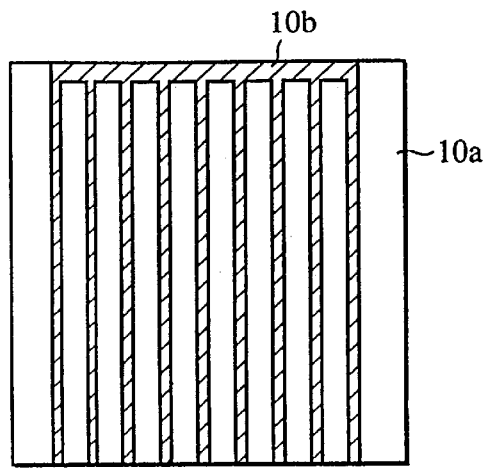
FIG. 1 is a plan view showing a counterelectrode having layers of an electrically conductive material formed thereon in the form of lengthwise stripes.

The present invention will be described in detail hereinbelow.

The counterelectrode for the smart window according to the present invention includes a linear electrically conductive material on the surface of a transparent substrate.

There is no particular limitation to the transparent substrate if it exhibits transparency and a smooth surface. The constituent material, thickness, size or shape may be selected suitably depending upon the usage and application. It is also not essential that the transparent substrate be electrically conductive although the transparent substrate may preferably be electrically conductive. Specifically, the transparent substrate may be enumerated by a glass substrate, an ITO (indium tin oxide) glass substrate, a tin oxide glass substrate, an ITO glass substrate on which an electrochromic material, such as NiO, $Cr_2O_3$ or CoO, is vapor deposited, and plastic films, such as films of polyester, polysulfone, cellulose triacetate, polycarbonate, polyimide, polystyrene or polymethylpentene, on which electrochromic materials, such as NiO, $Cr_2O_3$ or CoO, is optionally vapor deposited. Most preferred is a glass substrate or an ITO glass substrate or a substrate of ITO glass on which is deposited an electrochromic material, such as NiO, $CrO_3$ or CoO.

In the counterelectrode for the smart window according to the present invention, the electrically conductive material provided on the surface of the transparent substrate has an area of not less than 10 $m^2/g$, preferably 50 to 5000 $m^2/g$ and most preferably 300 to 4000 $m^2/g$. There is no particular limitation to the electrically conductive material if it exhibits electrical conductivity of not lower than $10^{-6}$ $\Omega^{-1} \cdot cm^{-1}$ at 25° C., preferably of not lower than $10^{-4}$ $\Omega^{-1} \cdot cm^{-1}$ at 25° C., more preferably of not lower than $10^{-2}$ $\Omega^{-1} \cdot cm^{-1}$ at 25° C., and the most preferably of not lower than $10^{-1}$ $\Omega^{-1} \cdot cm^{-1}$ at 25° C. The electrically conductive material may be enumerated by porous carbon, electrically conductive polymeric material, or a mixture thereof. With the area of the electrically conductive material less than 10 $m^2/g$, sufficient coloring efficiency cannot be achieved if the material is used for the smart window.

The porous carbon that may be employed as the electrically conductive material includes activated charcoal. Such activated charcoal may be in the powder or fiber form, and may be produced by carbonizing and activating coconut husk, petroleum pitch, phenolic resin, rayon, phenol fibers or polyacrylonitrile fibers, by way of examples.

The electrically conductive high molecular material includes such material composed mainly of polyaniline, polythiophene, polypyrrole, polyphenylene vinylene or polyacene and processed with doping. Porous metal oxides, such as porous NiO, $Cr_2O_3$, CuO, $Al_2O_3$ or $SiO_2$ may be mixed into the electrically conductive material.

The electrically conductive material is formed linearly on the surface of the transparent substrate. The electrically conductive material on the substrate is usually in the form of stripes of straight or curved lines such as lengthwise stripes, lateral stripes or wave line stripes; a grid of straight stripes; a grid formed of the combination of polygons or circles such as a honeycomb; reticulation such as the combination of aforementioned stripes extending in three or more different directions; or a frame. But there is no limitation to the shape of the electrically conductive material provided that the transparency or light-transmittance of the smart window is not deteriorated.

The line width or the line array of the linear electrically conductive material may be optionally selected depending on the type of the material, the volume or the usage of the electrochromic material or the quality of the electrochromic device, without any limitation, if within a range which is not obstructive to the transparency or light transmittance required of the counterelectrode in its entirety. However, the line width of the electrically conductive material is usually 5 μm to 1 cm, preferably 50 to 5000 μm and more preferably 100 to 2000 μm. If clearness of the landscape or the image transmitted or the high definition of the reflected image is particularly desired, plural parallel lines of the electrically conductive material having the same line width may preferably be formed on the transparent electrode. The distance between neighboring lines, which may be optionally set in consideration of the aesthetic feature and the capacity of the counterelectrode, is usually 1 mm to 10 cm and preferably 5 mm to 5 cm. The plural parallel lines of the electrically conductive material may also intersect one another at a pre-set angle.

Figure 2:
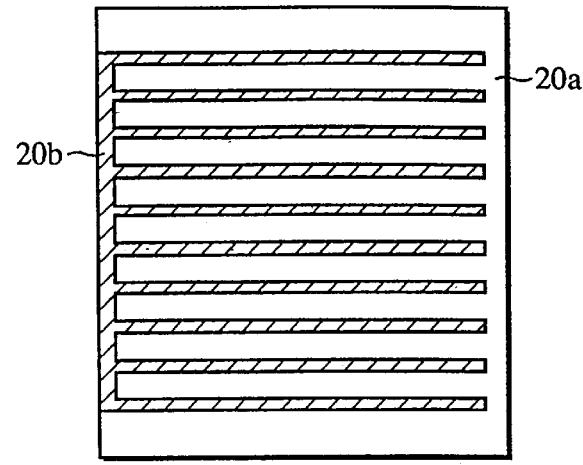
FIG. 2 is a plan view showing a counterelectrode having layers of an electrically conductive material formed thereon in the form of lateral stripes.
Figure 3:
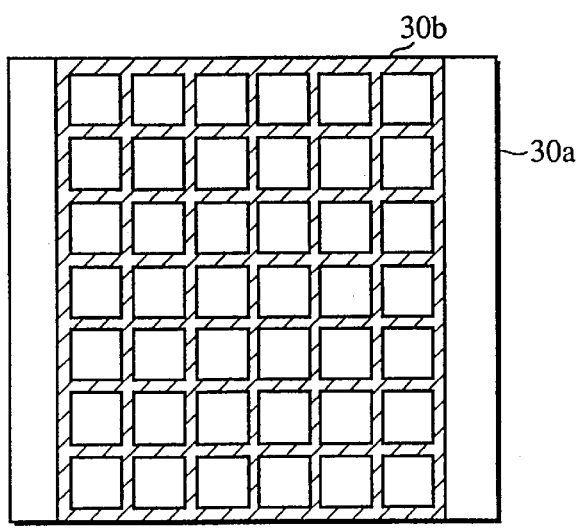
FIG. 3 is a plan view showing a counterelectrode having layers of an electrically conductive material formed thereon in the form of a grid.
Figure 4:
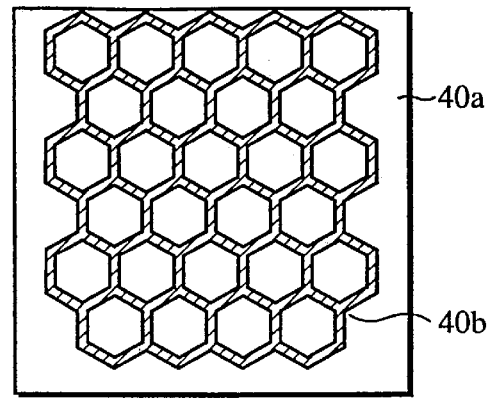
FIG. 4 is a plan view showing a counterelectrode having layers of an electrically conductive material formed thereon in the form of a honeycomb.
Figure 5:
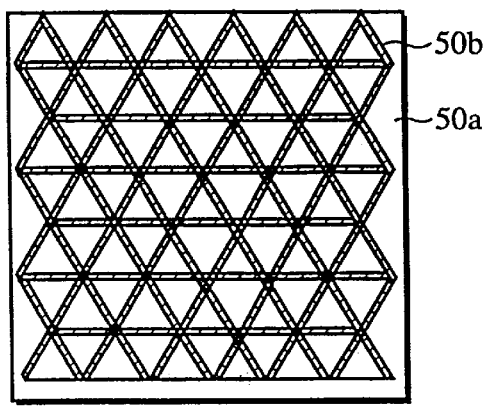
FIG. 5 is a plan view showing a counterelectrode having layers of an electrically conductive material formed thereon in the form of a triangular grid.
Figure 6:
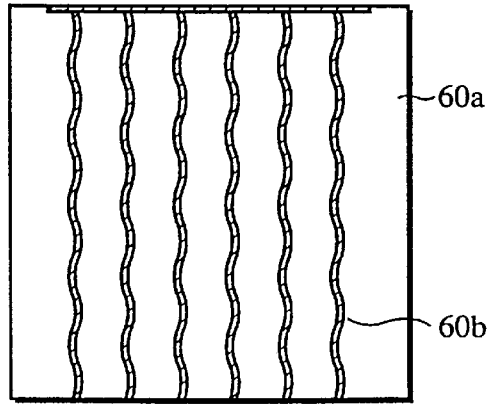
FIG. 6 is a plan view showing a counterelectrode having layers of an electrically conductive material formed thereon in the form of wave lines.
Figure 7:
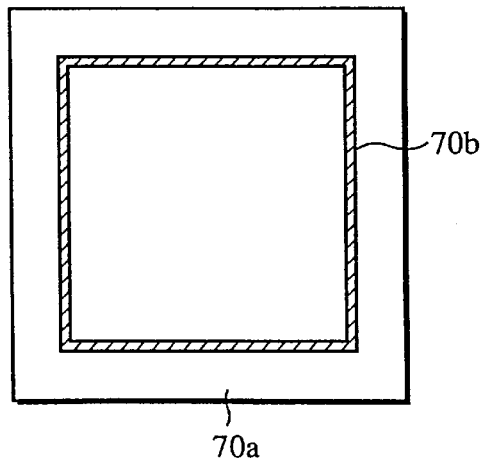
FIG. 7 is a plan view showing a counterelectrode having layers of an electrically conductive material formed thereon in the form of a frame.

FIGS. 1 to 7 illustrate certain examples of the linear electrically conductive material. FIG. 1 shows, in a plan view, an electrically conductive material 10b arranged as lengthwise stripes formed on a transparent substrate 10a, while FIG. 2 shows, in a plan view, an electrically conductive material 20b arranged as lateral stripes formed on a transparent substrate 20a. FIG. 3 shows, similarly in a plan view, an electrically conductive material 30b formed as a grid on a transparent substrate 30a. FIG. 4 shows, similarly in a plan view, an electrically conductive material 40b formed as a honeycomb on a transparent substrate 40a. FIG. 5 shows, similarly in a plan view, an electrically conductive material 50b formed as a triangular grid on a transparent substrate 50a. FIG. 6 shows, similarly in a plan view, an electrically conductive material 60b formed as wave lines on a transparent substrate 60a. FIG. 7 shows, similarly in a plan view, an electrically conductive material 70b formed as a frame on a transparent substrate 70a.

There is no particular limitation to the method of preparing the counterelectrode for the smart window according to the present invention. In general, the counterelectode may be prepared by a method of mixing the above-mentioned specified electrically conductive material with a binder to form a paste which is then printed on the surface of the transparent substrate by screen printing, a method of bonding the above-mentioned specified electrically conductive material in the fiber form onto the transparent substrate surface with an electrically conductive adhesive, or a method of charging a paste mixture composed of the above-mentioned specified electrically conductive material and the binder into a groove previously formed in the transparent substrate surface and removing excess paste using a spatula or the like.

There is no particular limitation to the binder if it is inert to and insoluble in an electrolytic solution after curing. The binder may be enumerated by polymeric solid electrolytes, epoxy resins, polystyrol, carboxymethyl cellulose or the like.

The electrochromic device or smart window according to the present invention includes a counterelectrode having the linear electrically conductive material, an electrochromic electrode having an electrochromic layer formed on its surface, and a layer of an electrolyte arranged between the counterelectrode and the electrochromic electrode.

The electrolyte may be a liquid electrolyte or a polymeric solid electrolyte, as may be optionally selected according to the usage and application. The liquid electrolyte may be enumerated by a solution prepared by dissolving alkali metal salts, alkaline earth metal salts or quaternary ammonium salts in an organic solvent, such as, for example propylene carbonate, ethylene carbonate, sulfolane, γ-butyrolactone, dimethylformamide, dimethylsulfoxide, ethylene carbonate, tetrahydrofurane or dimethoxyethane. The polymeric solid electrolyte may be enumerated by a polymeric solid electrolyte prepared by dissolving alkali metal salts, alkaline earth metal salts or quaternary ammonium salts in a polymer matrix such as, for example polyethylene oxide or polyoxyethylene glycol polymethacrylate.

The electrochromic electrode may be prepared by forming a layer of an electrochromic material on the surface of the transparent electrically conductive electrode. For example, the electrochromic electrode may be prepared by forming a layer of an electrochromic material by vacuum deposition, vacuum deposition by an electron beam or sputtering on the electrically conductive surface of an ITO glass used as the transparent electrically conductive substrate.

The electrochromic material may be enumerated by substances colored by reducion, such as $WO_3$, $MoO_3$, $V_2O_5$, $Nb_2O_5$ or $TiO_2$, or substances colored by oxidization, such as $Cr_2O_3$, $MnO_2$, $CoO$ or $NiO$.

If the liquid electrolyte is employed as an electrolyte in preparing the electrochromic device, it may occasionally be desirable to arrange an insulating layer between the electrochromic electrode and the counterelectrode for preventing shorting between the electrodes. There is no particular limitation to the shape or the constituent material of the insulating layer if the latter is capable of preventing shorting between the electrodes without impairing ion conductivity between the electrodes, light transmittance of the smart window in its entirety or reactivity of the electrodes with the electrolytic solution. Specifically, an electrically insulating transparent or opaque film(s) or layer(s) is preferably arranged on a linear portion of the electrically conductive material. The insulating film may preferably be enumerated by a polyester film, a polyethylene film or a polypropylene film.

If the solid electrolyte is employed in the preparation of the electochromic device, the insulating layer may be eliminated if the solid electrolyte is not conductive to electrons. However, the insulating layer is required if the solid electrolyte exhibits conductivity to electrons.

The counterelectrode for the electrochromic device or smart window according to the present invention has the electrically conductive material of a larger capacity having a specified surface area in the linear form, so that the counterelectrode exhibits a high electrochromic efficiency despite the lower applied voltage, when combined with a variety of electrochromic materials, as a result of which the counterelectrode is superior in the service life in terms of the number of coloring and bleaching cycles. Also, the electrochromic device or smart window of the present invention employing the above-mentioned specified counterelectrode, has a high electrochromic efficiency and superior service life in terms of the number of coloring and bleaching cycles. Thus, the smart window may be employed for various usage and application, such as for a car glass, building windows or partitions.

EXAMPLES OF THE INVENTION

The present invention will now be explained in further detail with reference to Examples and Comparative Examples, which are given only by way of illustration and are not intended for limiting the invention.

Figure 8:
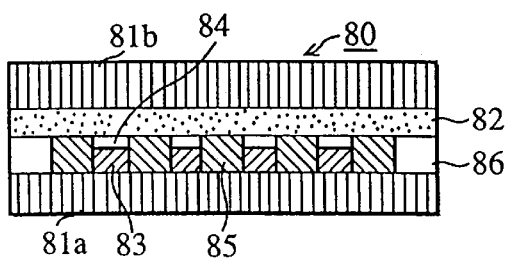
FIG. 8 is a cross-sectional view of a smart window for general illustration prepared in the Example of the present invention.

Referring to FIG. 8, a smart window prepared in the Examples of the present invention is explained. FIG. 8 shows, in a cross-sectional view, a smart window 80 comprised of an ITO glass 81a, a linear electrically conductive material 83 formed on the ITO glass 81a and an insulating layer 84 formed on the electrically conductive material 83 for providing a counterelectrode. On the other hand, an electrochromic material 82 is vapor-deposited on another ITO glass 81b for providing an electrode of an electrochromic material (electrochromic electrode). The counterelectode and the electrochromic electrode are stacked together with an electrolyte 85 in-between. The electrolyte 85 is sealed by a sealant 86 between the counterelectode and the electrochromic electrode. The electrically conductive material 83 is formed as various forms as described in the following Examples.

EXAMPLE 1

Preparation of Counterelectrode

On an ITO glass, 10 cm×10 cm in size, fibers of activated charcoal (produced by GUN EI CHEMICAL INDUSTRY CO., LTD.) having surface area of 1500 $m^2$/g were bonded in the form of a grid as shown in FIG. 3, using an electrically conductive adhesive prepared by TOKURIKI KAGAKU KENKYUSHO under the trade name of "Silvest P-255". The shape of the grid of the fibers of activated charcoal was of a grid line interval of 2 cm and a grid line width of 0.8 mm. The amount of the fibers of the activated charcoal was 0.85 mg/cm. A polyester film was then bonded on the fibers of activated charcoal as an insulating layer to complete a counterelectrode.

Preparation of Electrochromic Electrode

On an ITO glass, 10 cm×10 cm in size, $WO_3$ was deposited at room temperature under vacuum to have a thickness of approximately 5000 Å under the condition of 20 to 30 Å/second to prepare an electrochromic electrode.

Preparation of Electrochromic Device

The electrochromic electrode was placed facing the counterelectrode and the four sides of the resulting assembly were sealed with an epoxy resin sealant with a width of 5 mm. A solution of $LiClO_4$ in propylene carbonate (1M/lit.), as an electrolytic solution, was charged in vacuum into the inside of the assembly and an injection port was sealed with epoxy resin. A lead wire was connected to each of the electrochromic electrode and the counterelectrode to complete the smart widow. The properties of the smart window thus prepared were evaluated by the following tests.

Coloring Test

An electrical voltage of 1 V was applied across the electrochromic electrode as a negative electrode and the counterelectrode as a positive electrode. It was seen that the smart window was colored to have a uniform blue color. The optical density during coloration was 1.08.

Bleaching Test

An electrical voltage of 1 V was then applied across the electrochromic electrode as a positive electrode and the counterelectrode as an negative electrode. It was seen that the coloration disappeared quickly. The optical density at this time was 0.20. The difference between the optical density during the state of coloration and that on bleaching was 0.88, thus testifying to sufficient coloration and bleaching effects.

Cyclic Test

The coloring and bleaching tests were carried out each 1,000 times. It was seen that the cyclic characteristics were highly stable and no bleaching nor lowering in response or difference in the optical density was noticed.

COMPARATIVE EXAMPLE 1

A smart window was prepared in the same way as in Example 1, except that a grid of the activated charcoal fibers was not provided in the counterelectrode. The electrochromic device thus prepared was driven under the same conditions as those used for Example 1. It was seen that the electrochromic efficiency was only poor, with the difference in the optical density between the coloring anf bleaching states being 0.21.

EXAMPLE 2

On an ITO glass 10 cm×10 cm in size, fibers of activated charcoal (produced by GUN EI CHEMICAL INDUSTRY CO. LTD.), having a surface area of 1500 $m^2/g$, were bonded in the form of lateral stripes as shown in FIG. 2, using the same electrically conductive adhesive as that used in Example 1. The stripe line interval of the fibers of activated charcoal was 1 cm, with the stripe line width being 0.5 mm. The amount of the fibers of the activated charcoal was 0.40 mg/cm. A polyester film was then bonded on the fibers of activated charcoal as an insulating layer to complete a counterelectrode.

A smart window was prepared using the same electrochromic electrode and the same electrolytic solution as those used in Example 1, and was driven in operation under the same conditions as those used in Example 1. It was found that the electrochromic efficiency was satisfactory, with the difference between the colored and bleached states being as high as 1.03. After the cyclic test consisting of 1,000 coloring tests and 1,000 bleaching tests, there occurred no remnant coloration nor lowering in the response or in the difference in the optical density, and the cyclic characteristics were found to be highly stable.

EXAMPLE 3

On an ITO glass, 10 cm×10 cm in size, polypyrrole powders with a surface area of 73 $m^2/g$ obtained by electrolytic polymerization were bonded in the form of lateral stripes shown in FIG. 2, using the same electrically conductive adhesive as that used in Example 1. The stripe line interval and the stripe line width were 1 cm and 0.5 mm, respectively, while the amount of the polypyrrole powders was 0.65 mg/cm. A polyester film was then bonded as an insulating film on the polypyrrole layer to complete a counterelectrode.

A smart window was then prepared using the same electrochromic electrode and the same electrolytic solution as those used in Example 1, and was driven in operation under the same conditions as those used in Example 1. It was found that the electrochromic efficiency was satisfactory with the difference between the state of coloration and that of bleaching being as high as 0.96. After the cyclic test consisting of 1,000 coloring tests and 1,000 tests of bleaching, there occurred no remnant coloration nor lowering in the response or in the difference in the optical density, and the cyclic characteristics were found to be highly stable.

COMPARATIVE EXAMPLE 2

A smart window was prepared in the same way as in Example 1, except that the fibers of activated charcoal in Example 1 were replaced by a copper wire having a diameter of 0.5 mm and a surface area of $8.93 \times 10^{-4} \cdot m^2/g$. The electrochromic device thus prepared was driven in operation under the same conditions as those used for Example 1. It was seen that the electrochromic efficiency was only poor with the difference in the optical density during the state of coloration and the state of beaching being 0.27.

COMPARATIVE EXAMPLE 3

On an ITO glass, 10 cm×10 cm in size, graphite powders with a surface area of 5 $m^2/g$ were bonded in the form of lateral stripes shown in FIG. 2, using the same electrically conductive adhesive as that used in Example 1. The stripe line interval and the stripe line width were 1 cm and 0.5 mm, respectively, while the amount of the graphite per stripe line was 0.55 mg/cm. A polyester film was then bonded as an insulating film on the graphite layer to complete a counterelectrode.

A smart window was prepared using the same electrochromic electrode and the same electrolytic solution as those used in Example 1. The smart window thus prepared was driven in operation under the same conditions as those used for Example 1. It was seen that the electrochromic efficiency was only poor with the difference in the optical density during the state of coloration and the state of beaching being 0.27. After the cyclic test consisting of 1,000 coloring tests and 1,000 bleaching tests, remnant coloration, the lowering in the response and in the difference in the optical density were noticed.

EXAMPLE 4

On an ITO glass, 10 cm×10 cm in size, fibers of activated charcoal (produced by GUN EI CHEMICAL INDUCTRY CO., LTD.) having surface area of 1500 $m^2/g$ were bonded in the form of a honeycomb consisting of regular hexagons as shown in FIG. 4, using an electrically conductive adhesive used in Example 1. The length of a side of the regular hexagon was 1.5 cm, and the line width was 0.8 mm. The amount of the fibers of activated charcoal per stripe line was 0.85 mg/cm. A polyester film was then bonded as an insulating film on the fibers of activated charcoal layer to complete a counterelectrode.

A smart window was prepared using the same electrochromic electrode and the same electrolytic solution as those used in Example 1. The smart window thus prepared was driven in operation under the same conditions as those used for Example 1. It was found that the electrochromic efficiency was excellent with the difference in optical density between the state of coloration and that of bleaching being as high as 1.25. After the cyclic test consisting of 2,000 coloring tests and 2,000 tests of bleaching, there occurred no remnant coloration nor lowering in the response or in the difference in the optical density, and the cyclic characteristics were found to be highly stable.

Although the present invention has been described with reference to the preferred examples, it should be understood that various modifications and variations can be easily made by those skilled in the art without departing from the spirit of the invention. Accordingly, the foregoing disclosure should be interpreted as illustrative only and is not to be interpreted in a limiting sense. The present invention is limited only by the scope of the following claims.

What is claimed is:

1. A counterelectrode for a smart window comprising a transparent substrate and an electrically conductive material formed in a linear pattern on a surface of said transparent substrate, said electrically conductive material having a surface area of not less than 10 $m^2/g$ and electrical conductivity of not less than $10^{-6} \Omega^{-1} \cdot cm^{-1}$ at 25° C., said electrically conductive material being selected from the group consisting of porous carbon and an electrically conductive polymeric material.

2. The counterelectrode as claimed in claim 1 wherein said transparent substrate is selected from the group consisting of a glass substrate, an indium/tin oxide glass substrate, a tin oxide glass substrate, a glass substrate having an electrochromic material deposited thereon, an indium/tin oxide glass substrate having an electrochromic material deposited thereon, a plastic film substrate and a plastic film substrate having an electrochromic material deposited thereon.

3. The counterelectrode as claimed in claim 1 wherein said electrically conductive material has a surface area of 50 to 5,000 m$^2$/g and electrical conductivity of not less than $10^{-2} \Omega^{-1} \cdot cm^{-1}$ at 25° C.

4. The counterelectrode as claim in claim 1 wherein said porous carbon is activated charcoal.

5. The counterelectrode as claimed in claim 1 wherein said electrically conductive material linear pattern comprises at least one line having a line width of 5 μm to 1 cm.

6. The counterelectrode as claimed in claim 5 wherein said electrically conductive material linear pattern comprises at least one line having a line width of 50 μm to 5,000 μm.

7. The counterelectrode as claimed in claim 1 wherein said linear pattern is in a form of a plurality of parallel lines having the same line width.

8. The counterelectrode as claimed in claim 1 wherein said linear pattern is in a form selected from the group consisting of a stripe form with straight lines, a stripe form with curved lines, a grid form, and a frame form.

9. The counterelectrode as claimed in claim 1 wherein said electrically conductive material has a surface area of 300 m$^2$/g to 5,000 m$^2$/g.

10. A smart window comprising:
    a counterelectrode having a transparent substrate and an electrically conductive material in a linear pattern formed on a surface of said transparent substrate, said electrically conductive material having a surface area of not less than 10 m$^2$/g and electrical conductivity of not less than $10^{-6} \Omega^{-1} \cdot cm^{-1}$ at 25° C., said electrically conductive material being selected from the group consisting of porous carbon and an electrically conductive polymeric material,
    an electrochromic electrode having a layer of an electrochromic material formed on its surface, and
    a layer of an electrolyte arranged between said counterelectrode and said electrochromic electrode and in contact with said layer of the electrochromic material.

11. The smart window as claimed in claim 10 further comprising an insulating layer between said electrochromic electrode and said counterelectrode.

12. The smart window as claimed in claim 11 wherein said insulating layer is applied on said linear electrically conductive material.

13. The smart window as claimed in claim 10 wherein said linear pattern is in a form selected from the group consisting of a stripe form with straight lines, a stripe form with curved lines, a grid form, and a frame form.

14. The smart window as claimed in claim 10 wherein said electrically conductive material has a surface area of 300 m$^2$/g to 5,000 m$^2$/g.

15. The smart window as claimed in claim 10 wherein said linear pattern is in a form of a plurality of parallel lines having the same line width.

16. The smart window as claimed in claim 15 wherein said parallel lines having the same line width intersect one another at a pre-set angle.

17. The smart window as claimed in claim 15 wherein the distance between adjacent lines of said plurality of parallel lines is 1 mm to 10 cm.

18. The smart window as claimed in claim 15 wherein the distance between adjacent lines of said plurality of parallel lines is 5 mm to 5 cm.

19. The counterelectrode as claimed in claim 1 wherein the transparent substrate is an electrically conductive substrate.

* * * * *